(12) United States Patent
Harding et al.

(10) Patent No.: US 8,554,481 B2
(45) Date of Patent: Oct. 8, 2013

(54) SYSTEM AND METHOD FOR DECLUSTERING WELL LOG SAMPLES

(75) Inventors: Andrew W. Harding, Danville, CA (US); Michael W. Waite, City Beach (AU); Michael J. Pyrcz, Humble, TX (US)

(73) Assignee: Chevron U.S.A Inc., San Ramon, CA (US)

( * ) Notice: Subject to any disclaimer, the term of this patent is extended or adjusted under 35 U.S.C. 154(b) by 335 days.

(21) Appl. No.: 12/960,848

(22) Filed: Dec. 6, 2010

(65) Prior Publication Data

US 2012/0143507 A1    Jun. 7, 2012

(51) Int. Cl.
*G06F 17/18* (2006.01)
*G06F 19/00* (2011.01)

(52) U.S. Cl.
USPC .............................. 702/6; 702/173; 702/179

(58) Field of Classification Search
USPC ................. 702/2, 6, 11, 14, 16, 18, 180, 181, 702/173, 179; 324/338; 367/73
See application file for complete search history.

(56) References Cited

U.S. PATENT DOCUMENTS

2012/0084007 A1* 4/2012 Tran et al. ......................... 702/6

* cited by examiner

*Primary Examiner* — John H Le
(74) *Attorney, Agent, or Firm* — Carlos Hanze; Albert K. Shung

(57) ABSTRACT

Wellbore data samples related to a subsurface volume of interest are weighted based on wellbore orientation and/or stratal orientation. Declustering weights are determined that account for differences in sampling density caused by wellbore and/or stratal structure orientation. The declustering weights may be implemented to weight samples of parameters taken within wellbores, and/or to update or adjust other weights determined according to other schemes.

17 Claims, 4 Drawing Sheets

SYSTEM AND METHOD FOR DECLUSTERING WELL LOG SAMPLES

FIELD

This disclosure relates to declustering well log samples to reduce biasing caused by wellbore and/or stratal structure orientation.

BACKGROUND

Reservoir property data from hydrocarbon exploration and production wells is generally acquired at a constant rate along well bores. This may cause subsurface reservoir zones to be sampled more frequently in high angle and/or horizontal wellbores compared with vertical wells. Horizontal stratification of the subsurface results in additional data in non-vertical wellbores that does not add additional information in proportion to the number of samples. This may cause biasing toward the targeted reservoir rock properties. Conventional systems and methods for declustering well log data are costly in terms of processing and/or storage requirements, and may not properly account for the role of wellbore and/or stratal orientation in biasing.

SUMMARY

One aspect of this disclosure relates to a method of declustering samples of a property within a subsurface volume of interest. In one embodiment the method comprises obtaining samples of a property within a subsurface volume of interest, the samples having been acquired from one or more wellbores formed within the subsurface volume of interest; and determining weights corresponding to the individual samples such that a weight of an individual sample is a function of the orientation of a wellbore from which the individual sample was acquired.

Another aspect of this disclosure relates to a system configured to decluster samples of a property within a subsurface volume of interest. In one embodiment, the system comprises electronic storage and one or more processors. The electronic storage stores samples of a property within a subsurface volume of interest that have been acquired from one or more wellbores formed within the subsurface volume of interest. The one or more processors are configured to execute computer program modules including a weight determination module. The weight determination module is configured to determine weights corresponding to the individual samples such that a weight of an individual sample is a function of the orientation of a wellbore from which the individual sample was acquired.

Yet another aspect of this disclosure relates to an electronic, computer-readable, non-transitory storage media storing instructions configured to cause one or more processors to execute a method of declustering samples of a property within a geophysical volume of interest. In one embodiment, the method comprises obtaining samples of a property within a subsurface volume of interest, the samples having been acquired from one or more wellbores formed within the subsurface volume of interest; and determining weights corresponding to the individual samples such that a weight of an individual sample is a function of the orientation of a wellbore from which the individual sample was acquired.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
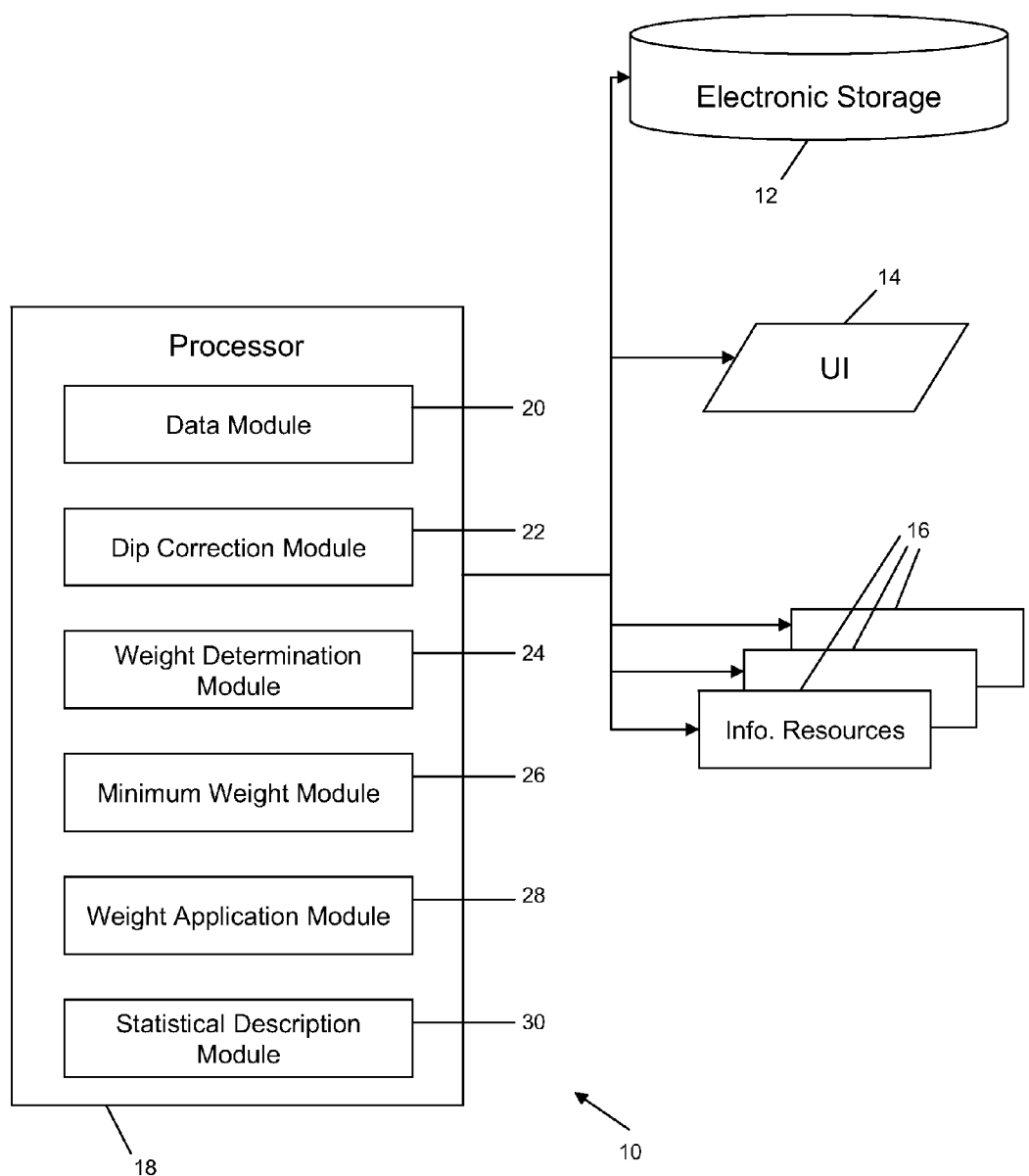
FIG. 1 illustrates a system configured to decluster samples taken within one or more wellbores formed in a subsurface volume of interest, in accordance with one or more embodiments of the invention.

The present technology may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technology may be coded in different languages for application in a variety of computing platforms and environments. It will be appreciated that the scope and underlying principles of the present technology are not limited to any particular computer software technology.

Moreover, those skilled in the art will appreciate that the present technology may be practiced using any one or combination of hardware and software configurations, including but not limited to a system having single and/or multi-processor computer processors system, hand-held devices, programmable consumer electronics, mini-computers, mainframe computers, and the like. The technology may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present technology. Such devices and articles of manufacture also fall within the spirit and scope of the present technology.

Referring now to the drawings, embodiments of the present technology will be described. The technology can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present technology are discussed below. The appended drawings illustrate only typical embodiments of the present technology and therefore are not to be considered limiting of its scope and breadth.

FIG. 1 illustrates a system 10 configured to weight wellbore data samples related to a subsurface volume of interest based on wellbore orientation. In some implementations, system 10 is configured to determine declustering weights that account for differences in sampling density caused by wellbore orientation. The weights determined by system 10 may be implemented to weight samples of parameters taken within wellbores, and/or to update or adjust other weights determined according to other schemes. In one embodiment, system 10 includes one or more of electronic storage 12, a user interface 14, one or more information resources 16, one or more processors 18, and/or other components.

In one embodiment, the electronic storage 12 comprises electronic storage media that electronically stores information. The electronic storage media of the electronic storage 12 may include system storage that is provided integrally (i.e., substantially non-removable) with the system 10 and/or removable storage that is removably connectable to the system 10 via, for example, a port (e.g., a USB port, a firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 12 may store software algorithms, information determined by the processor 18, information received via the user interface 14, information received from the information resources 16, and/or other information that enables the system 10 to function as described herein. The electronic storage 12 may be a separate component within the system 10, or the electronic storage 12 may be provided integrally with one or more other components of the system 10 (e.g., the processor 18).

The user interface 14 is configured to provide an interface between the system 100 and a user through which the user may provide information to and receive information from the system 10. This enables data, results, and/or instructions and any other communicable items, collectively referred to as "information," to be communicated between the user and the system 10. As used herein, the term "user" may refer to a single individual or a group of individuals who may be working in coordination. Examples of interface devices suitable for inclusion in the user interface 14 include one or more of a keypad, buttons, switches, a keyboard, knobs, levers, a display screen, a touch screen, speakers, a microphone, an indicator light, an audible alarm, and/or a printer. In one embodiment, the user interface 14 actually includes a plurality of separate interfaces.

It is to be understood that other communication techniques, either hard-wired or wireless, are also contemplated by the present technology as the user interface 14. For example, the present technology contemplates that the user interface 14 may be integrated with a removable storage interface provided by the electronic storage 12. In this example, information may be loaded into the system 10 from removable storage (e.g., a smart card, a flash drive, a removable disk, etc.) that enables the user to customize the implementation of the system 10. Other exemplary input devices and techniques adapted for use with the system 10 as the user interface 14 include, but are not limited to, an RS-232 port, RF link, an IR link, modem (telephone, cable or other). In short, any technique for communicating information with the system 10 is contemplated by the present technology as the user interface 14.

The information resources 16 include one or more sources of information related to the geologic volume of interest. By way of non-limiting example, one of information resources 16 may include logs of downhole measurements taken through one or more wellbores formed within a subsurface volume of interest. Such logs may include measurements of porosity, impedance, permeability, velocity, resistivity, radioactivity, and/or other measurements. As another example, one of information resources 16 may include well information that describes the size, shape, location, orientation, depth, physical properties, and/or other parameters of one or more wells formed within the subsurface volume of interest.

The processor 18 is configured to provide information processing capabilities in the system 10. As such, the processor 18 may include one or more of a digital processor, an analog processor, a digital circuit designed to process information, an analog circuit designed to process information, a state machine, and/or other mechanisms for electronically processing information. Although the processor 18 is shown in FIG. 1 as a single entity, this is for illustrative purposes only. In some implementations, the processor 18 may include a plurality of processing units. These processing units may be physically located within the same device or computing platform, or the processor 18 may represent processing functionality of a plurality of devices operating in coordination.

As is shown in FIG. 1, the processor 18 may be configured to execute one or more computer program modules. The one or more computer program modules may include one or more of a data module 20, a weight determination module 22, a minimum weight module 24, a dip correction module 26, a weight application module 28, a statistical description module 30, and/or other modules. The processor 18 may be configured to execute modules 20, 22, 24, 26, 28, and/or 30 by software; hardware; firmware; some combination of software, hardware, and/or firmware; and/or other mechanisms for configuring processing capabilities on the processor 18.

It should be appreciated that although the modules 20, 22, 24, 26, 28, and 30 are illustrated in FIG. 1 as being co-located within a single processing unit, in implementations in which the processor 18 includes multiple processing units, one or more of the modules 20, 22, 24, 26, 28, and/or 30 may be located remotely from the other modules. The description of the functionality provided by the different modules 20, 22, 24, 26, 28, and/or 30 described below is for illustrative purposes, and is not intended to be limiting, as any of the modules 20, 22, 24, 26, 28, and/or 30 may provide more or less functionality than is described. For example, one or more of the modules 20, 22, 24, 26, 28, and/or 30 may be eliminated, and some or all of its functionality may be provided by other ones of the modules 20, 22, 24, 26, 28, and/or 30. As another example, the processor 108 may be configured to execute one or more additional modules that may perform some or all of the functionality attributed below to one of the modules 20, 22, 24, 26, 28, and/or 30.

The data module 20 may be configured to obtain information (e.g., data) related to the subsurface volume of interest for further processing. Such information may be received from the information resources 16, the user via the user interface 14, the electronic storage 12, and/or other information sources. An example of obtained information may include one or more logs of downhole measurements taken within one or more wellbores formed within the subsurface volume of interest. Such logs may include one or more of a wireline log, a measurement-while-drilling log, and/or other logs of measurements taken within the one or more wellbores. The information obtained by data module 20 may include information related to the wellbores within which the obtained logs were taken. Such information may include, for example, information that describes the size, shape, location, orientation, depth, physical properties, and/or other parameters of one or more wellbores formed within the subsurface volume of interest Information received by the data module 20 may be utilized by one or more of modules 22, 24, 26, 28, and/or 30. Examples of some such utilizations are described below. The data module 20 may be configured to transmit information to one or more other components of the system 10.

Figure 2:
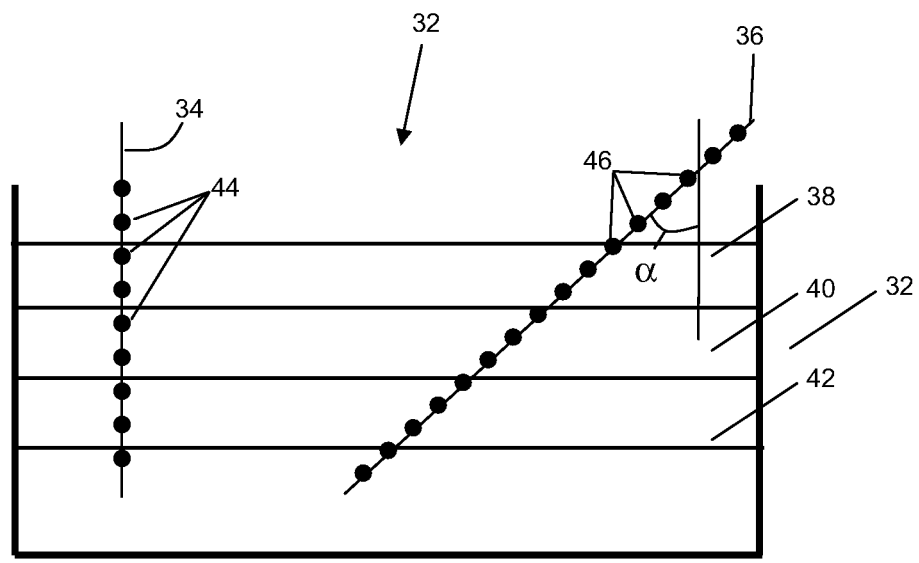
FIG. 2 illustrates a section of a subsurface volume of interest.

The weight determination module 22 may be configured to determine declustering weights for samples included within information obtained by data module 20. The declustering weights may adjust the samples to account for the impact of wellbore orientation on sample density. By way of example, FIG. 2 illustrates a portion of a subsurface volume of interest 32, with a first wellbore 34 and a second wellbore 36 formed therethrough. The first wellbore 34 is formed substantially parallel with the vertical, while the second wellbore 36 is formed at an angle α with respect to the vertical. The subsurface volume of interest 32 includes a first stratal layer 38, a second stratal layer 40, and a third stratal layer 42. A first set of points 44 represent the places along first wellbore 34 at which measurements are taken. A second set of points 46 represent places along second wellbore 36 at which measurements are taken.

As can be seen in FIG. 2, although the sampling density along the length of first wellbore 34 and second wellbore 36 are substantially the same, the sampling density in terms of depth within subsurface volume of interest 32 is not equal. Instead, the sampling density in terms of depth for second set of points 46 is significantly greater than the sampling density in terms of depth for first set of points 44 because of the difference in orientation between first wellbore 34 and second wellbore 36.

This difference in sampling density in terms of depth causes an imbalance if first set of points 44 and second set of points 46 are aggregated in the determination of a statistical description of subsurface volume of interest 32. For example, if first set of points 44 and second set of points 46 are aggregated in an unweighted manner to determine a value of the measured property for each of the individual layers 38, 40, and 42, the measurements taken at second set of points 46 will have a greater impact on the determined value than the measurements taken at first set of points 44. This is because more measurements are taken on a per stratal layer basis along second wellbore 36 than along first wellbore 34.

It will be appreciated that the illustration of the impact of wellbore orientation on two separate wellbores (34 and 36) in FIG. 2 is for illustrative purposes only. A wellbore path that is not straight through the subsurface volume of interest would have a similar impact on samples taken within the wellbore in sections having different orientations.

Returning to FIG. 1, in some implementations, weight determination module 22 is configured to determine declustering weights for samples included in one or more logs obtained by data module 20 based on the orientation and/or position of the one or more wellbores within which the measurements in the logs were taken. The declustering weights give greater weight to measurements taken closer to vertical, as these measurements will tend to be less densely sampled on a per stratal layer basis (e.g., for the reasons discussed above with respect to FIG. 2). In some implementations, the declustering weights are determined as a function of the angle of the wellbores to the vertical. For example, the declustering weight of a given sample may be determined as a function of the cosine of the angle between the wellbore within which the given sample was taken and the vertical, at or near the location at which the given sample was taken. This may be expressed according to the following relationship:

$$w = \cos \alpha; \quad (1)$$

where w represents the weight of the given sample, and α represents the angle between the vertical and the wellbore within which the given sample was taken, at or near the location in the wellbore at which the given sample was taken.

A wellbore may be formed within the subsurface volume of interest perpendicular, or substantially perpendicular, with the vertical. According to the weighting scheme applied by weight determination module 22 this may result in measurements taken along such a wellbore being assigned a weight so small that they are effectively reduced to zero. The minimum weight module 24 may be configured to determine a minimum weight that should be applied to measurements taken within the subsurface volume of interest. The minimum weight may be determined to avoid measurements being assigned weights so small that they are effectively ignored. The minimum weight module 24 assigns the minimum weight to any samples included in a set of samples for which weight determination module 22 has determined (or is determining, or will determine) a weight less than the minimum weight.

The minimum weight module 24 is configured to determine the minimum weight based on user input (e.g., via user interface 14), and/or automatically. Determination of minimum weight module 24 may be based on the sampling density in terms of well bore length, anisotropy in spatial continuity, and/or based on other parameters. The parameters used to determine minimum weight module 24 may be present in, or derived from, information obtained by data module 20, information received from user interface 14, electronic storage 12, information resources 16, and/or other information sources.

In some instances, the subsurface volume of interest may include one or more stratal layers that have significant dip with respect to the horizontal. As used herein, dip may refer to inclination of a stratal layer with respect to the horizontal. If a stratal layer has significant dip, it may impact the sampling density of a log in a manner that is not entirely accounted for by the weighting described above with respect to weight determination module 22 and/or minimum weight module 24. For example, referring back to FIG. 2, stratal layers 38, 40, and 42 are shown as being relatively parallel to the horizontal. As a result, weighting measurements taken within first wellbore 34 and second wellbore 36 based on the cosine of the angles of first wellbore 34 and second wellbore 36 with the vertical may provide a weighting that is beneficial.

Figure 3:
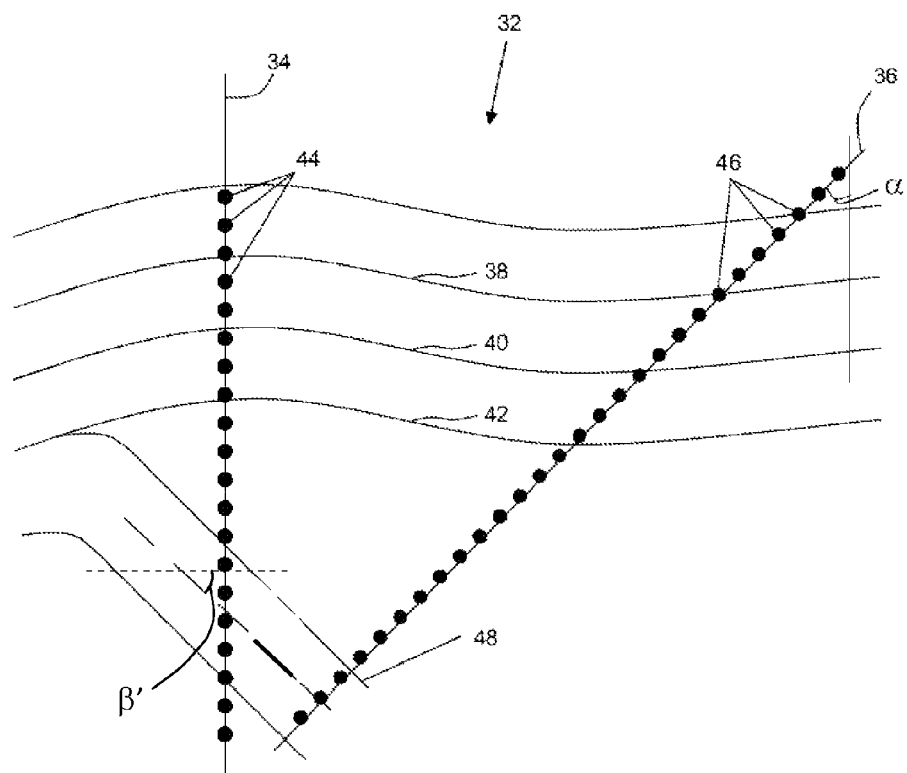
FIG. 3 illustrates a section of a subsurface volume of interest.

FIG. 3 illustrates subsurface volume of interest 32 further including a fourth stratal layer 48 having a significant dip (shown as β' in FIG. 3). As can be seen in FIG. 3, due the dip of fourth stratal layer 48, if samples taken at first set of points 44 and second set of points 46 are not weighted, a determination of the measured property within fourth stratal layer 48 may be overly influenced by the measurements taken at first set of points 44. This influence may be exacerbated if the measurements taken at first set of points 44 and second set of points 46 are weighted in accordance with the technique described above (which would assign a greater weight to measurements taken at first set of points 44).

Referring back to FIG. 1, dip correction module 26 is configured to adjust the angle between a wellbore and the vertical used to weight samples, in order to correct for stratal layer orientation. Such a correction may include adding the component of dip of a stratal layer (or other structure) along the wellbore from the angle between the wellbore and the vertical. This correction may be represented as:

$$\alpha_{corrected} = \alpha_{uncorrected} - \beta'; \quad (2)$$

where $\alpha_{corrected}$ represents the corrected angle to be used in the determination of sample weight, $\alpha_{uncorrected}$ represents the uncorrected angle between the wellbore and the vertical, and $\beta'$ represents the component of dip along the wellbore such that $\tan \beta' = \cos(\xi - \omega) * \tan \beta$, where $\xi$ and $\omega$ are the azimuths of the borehole and the stratal dip measured clockwise from the North. The dip correction module 26 may be configured to obtain information used to determine stratal layer dip and/or the component of stratal layer dip along wellbores based on information obtained by data module 20, information received from user interface 14, electronic storage 12, information resources 16, and/or other information sources.

In some implementations, dip correction module 26 may only adjust the angle between a wellbore and the vertical if stratal dip breaches a threshold amount of dip. The threshold amount of dip may be previously configured (e.g., as a coded parameter), determined based on user input (e.g., via user interface 14), and/or determined dynamically automatically.

The weight application module 28 is configured to apply the weights determined by weight determination module 22. This may include multiplying the weights determined by weight determination module 22 to the corresponding samples.

The statistical description module 30 is configured to determine one or more statistical descriptions of the subsurface volume of interest from the weighted samples. The statistical descriptions determined by statistical description module 30 from the weighted samples will have reduced biasing due to wellbore orientation and/or structural dip. By way of example, statistical description module 30 may be configured to determine a histogram, probability density function, cumulative density function, mean variance, semi-variance, covariance, and/or related statistics describing the subsurface volume of interest.

Figure 4:
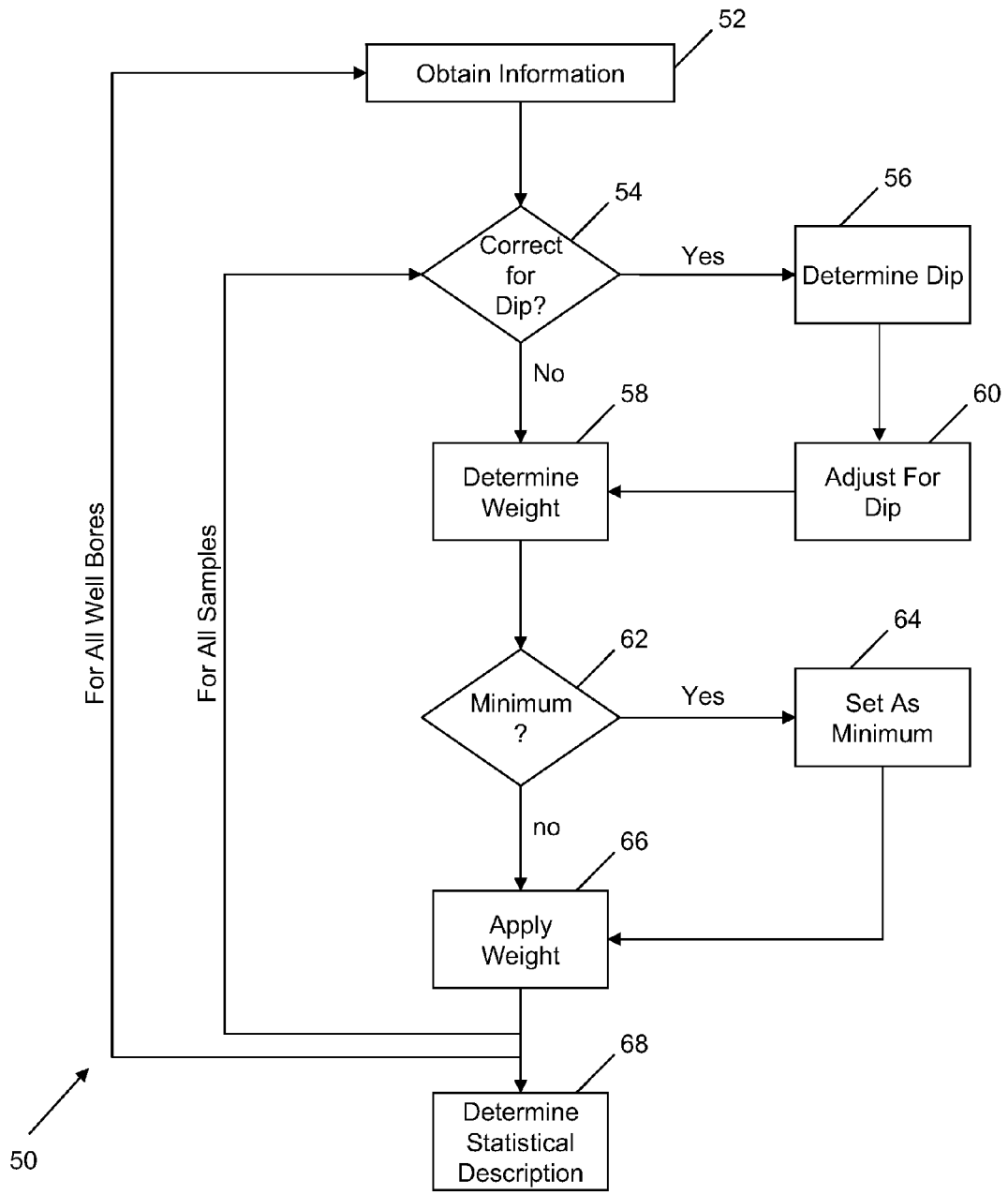
FIG. 4 illustrates a method of declustering samples taken within one or more wellbores formed in a subsurface volume of interest, according to one or more embodiments of the invention.

FIG. 4 illustrates a method 50 of determining declustering weights for samples taken within a subsurface volume of interest. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 4 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, information related to a set of samples taken within the subsurface volume of interest is obtained. The set of samples may have been taken within a wellbore formed in the subsurface volume of interest. The information obtained at operation 52 may include the samples themselves, information related to the wellbore (e.g., location, orientation, path, and/or other information), and/or other information. In one embodiment, operation 52 is performed by a data module similar to or the same as data module 20 (shown in FIG. 1 and described above).

At an operation 54, a determination is made as to whether a correction should be made for structural dip in determining a weight for a sample in the set of samples. In one embodiment, operation 54 is performed by a dip correction module similar to or the same as dip correction module 26 (shown in FIG. 1 and described above). Responsive to a determination at operation 54 that a correction should be made for the sample, method 50 proceeds to an operation 56. Responsive to a determination at operation 54 that a correction should not be made for the sample, method 50 proceeds to an operation 58.

At operation 56, the component of wellbore dip along the wellbore at or near where the sample was taken is determined. This may be determined from information obtained at operation 52. In one embodiment, operation 56 is performed by a dip correction module similar to or the same as dip correction module 26 (shown in FIG. 1 and described above).

At an operation 60, the angle between the wellbore at or near where the sample was taken and the vertical is adjusted to account for the component of wellbore dip along the wellbore. The may include adding the component of wellbore dip along the wellbore to the angle. In one embodiment, operation 56 is performed by a dip correction module similar to or the same as dip correction module 26 (shown in FIG. 1 and described above).

At operation 58, a declustering weight for the sample is determined. The declustering weight is determined to reduce biasing caused by wellbore and/or stratal structure orientation. The declustering weight may be determined as a function of the cosine of the angle of the wellbore where the sample was taken with respect to the vertical, or the declustering weight may be determined as a cosine of the corrected angle determined at operation 56. In one embodiment, operation 58 may be performed by a weight determination module similar to or the same as weight determination module 22 (shown in FIG. 1 and described above).

At an operation 62, a determination is made as to whether the declustering weight is too small. This determination may be made, for example, by comparing the declustering weight to a threshold weight. The threshold weight may be a minimum threshold, and/or some other threshold. In one embodiment, operation 62 is performed by a minimum weight module similar to or the same as minimum weight module 24 (shown in FIG. 1 and described above). Responsive to a determination that the declustering weight should be replaced, method 50 proceeds to an operation 64. Responsive to a determination that the declustering weight should not be replaced, method 50 proceeds to an operation 66.

At operation 64, the declustering weight determined at operation 58 is replaced with a minimum declustering weight. The method 50 may include determining the minimum declustering weight (e.g., as discussed above). In one embodiment, operation 58 is performed by a minimum weight module similar to or the same as minimum weight module 24 (shown in FIG. 1 and described above).

At operation 66, the declustering weight determined at operation 58, or the minimum declustering weight, is applied to the sample. Applying the declustering weight to the sample may include, for example, multiplying the declustering weight to the sample. In one embodiment, operation 66 is performed by a weight application module similar to or the same as weight application module 28 (shown in FIG. 1 and described above).

Method 50 loops back to operation 54 for all samples taken within the wellbore. Method 50 may loop back to operation 52 to include additional wellbores.

At an operation 68, a statistical description of the subsurface volume of interest may be determined based on the weighted samples. The statistical description may include a histogram, probability density function, cumulative density function, mean variance, semivariance, covariance, and/or related statistics describing the subsurface volume of interest. In one embodiment, operation 68 is performed by a statistical description module similar to or the same as statistical description module 30 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of declustering samples of a property within a subsurface volume of interest, the method comprising:
   obtaining samples of a property within a subsurface volume of interest, the samples having been acquired from one or more wellbores formed within the subsurface volume of interest; and
   determining weights corresponding to the individual samples, using a computer, such that a weight of an individual sample is a function of the orientation of a wellbore from which the individual sample was acquired, wherein the weight of the individual sample is a function of the cosine of the angle between the wellbore from which the individual sample was acquired and the vertical.

2. The method of claim 1, further comprising obtaining information indicating the orientations of the wellbores formed within the subsurface volume of interest.

3. The method of claim 1, further comprising creating a statistical description of the subsurface volume of interest, wherein in creating the statistical description the samples are weighted in accordance with the corresponding weights.

4. The method of claim 3, wherein the statistical description of the subsurface volume of interest includes a histogram, a probability density function, a cumulative density function, a mean variance, a semivariance, or a covariance.

5. The method of claim 1, wherein the determination of the weight of the individual sample comprises correcting a determination of the angle between the wellbore and the vertical for structural dip at or near the location in the wellbore at which the individual sample was acquired.

6. The method of claim 1, further comprising setting the weight of the individual sample at a minimum weight responsive to the weight of the individual sample being determined to be below the minimum weight.

7. A system configured to decluster samples of a property within a subsurface volume of interest, the system comprising:
   electronic storage storing samples of a property within a subsurface volume of interest, the samples having been acquired from one or more wellbores formed within the subsurface volume of interest; and
   one or more processors configured to execute computer program modules, the computer program modules including:
      a weight determination module configured to determine weights corresponding to the individual samples such that a weight of an individual sample is a function of the orientation of a wellbore from which the individual sample was acquired, wherein the weighting module is configured to determine the weight of the individual sample as a function of the cosine of the angle between the wellbore from which the individual sample was acquired and the vertical.

8. The system of claim 7, wherein the electronic storage further stores information indicating the orientations of the wellbores.

9. The system of claim 7, wherein the computer program modules further include a statistical description module configured to determine a statistical description of the subsurface volume of interest, wherein the statistical description module is configured to base the statistical description on the samples after weighting by the corresponding weights.

10. The system of claim 9, wherein the statistical description module is configured such that the statistical description comprises a histogram, a probability density function, a cumulative density function, a mean variance, a semivariance, or a covariance.

11. The system of claim 7, wherein the weighting module is configured such that the determination of the weight of the individual sample comprises correcting a determination of the angle between the wellbore and the vertical for structural dip at or near the location in the wellbore at which the individual sample was acquired.

12. The system of claim of claim 7, wherein further comprising a minimum weight module configured such that responsive to the weight of the individual sample being determined to be below a minimum weight, the weight of the individual sample is set at the minimum weight.

13. Electronic, computer-readable, non-transitory storage media storing instructions configured to cause one or more processors to execute a method of declustering samples of a property within a geophysical volume of interest, the method comprising: obtaining samples of a property within a subsurface volume of interest, the samples having been acquired from one or more wellbores formed within the subsurface volume of interest; and determining weights corresponding to the individual samples such that a weight of an individual sample is a function of the orientation of a wellbore from which the individual sample was acquired, wherein the weight of the individual sample is a function of the cosine of the angle between the wellbore from which the individual sample was acquired and the vertical.

14. The storage media of claim 13, wherein the method further comprises obtaining information indicating the orientations of the wellbores formed within the subsurface volume of interest.

15. The storage media of claim 13, wherein the method further comprises creating a statistical description of the subsurface volume of interest, wherein in creating the statistical description the samples are weighted in accordance with the corresponding weights.

16. The storage media of claim 13, wherein the statistical description of the subsurface volume of interest includes a histogram, a probability density function, a cumulative density function, a mean variance, a semivariance, or a covariance.

17. The storage media of claim 13, wherein the determination of the weight of the individual sample comprises correcting a determination of the angle between the wellbore and the vertical for structural dip at or near the location in the wellbore at which the individual sample was acquired.

* * * * *